United States Patent [19]

Choi

[11] Patent Number: 5,696,487
[45] Date of Patent: Dec. 9, 1997

[54] AUDIBLE FIRE ALARM APPARATUS

[75] Inventor: Hong-Seok Choi, Daegu, Rep. of Korea

[73] Assignee: Pyeong-Hwa Electronic Co., Daegu, Rep. of Korea

[21] Appl. No.: 389,908

[22] Filed: Feb. 16, 1995

[51] Int. Cl.⁶ .................................................. H04Q 1/30
[52] U.S. Cl. .................... 340/532; 340/692; 340/331; 379/37; 379/43; 379/38
[58] Field of Search ................................ 340/692, 331, 340/532; 379/37, 43, 38

[56] References Cited

U.S. PATENT DOCUMENTS

| | | | |
|---|---|---|---|
| 4,519,027 | 5/1985 | Vogelsberg | 364/185 |
| 4,531,114 | 7/1985 | Topol et al. | 340/539 |
| 4,682,348 | 7/1987 | Dawson et al. | 379/37 |
| 4,796,018 | 1/1989 | Nakanishi et al. | 340/691 |
| 4,816,809 | 3/1989 | Kim | 340/692 |
| 5,200,987 | 4/1993 | Gray | 379/40 |
| 5,438,607 | 8/1995 | Przygoda et al. | 379/38 |

*Primary Examiner*—Jeffery Hofsass
*Assistant Examiner*—Daryl C. Pope
*Attorney, Agent, or Firm*—Hedman, Gibson & Costigan, P.C.

[57] ABSTRACT

The audible alarm apparatuses include fire sensing portion, location setting portion for setting a location of the fire sensing portion, system controller for providing information about the location of the fire outbreak and controlling interface devices, DTMF generator, DTMF receiver, voice data storage portion responsive to the information outputted from the system controller for providing a voice data, parallel to serial converter, digital to analog converter, and amplifier, etc. The apparatuses give and take the information about the location of the fire outbreak directly with each other via a telephone line without a host computer.

3 Claims, 3 Drawing Sheets

AUDIBLE FIRE ALARM APPARATUS

FIELD OF THE INVENTION

The present invention relates generally to fire alarm apparatuses, and more particurally, to audible fire alarms apparatuses using telephone lines.

BACKGROUND OF THE INVENTION

Various structures have been proposed for a fire alarm apparatus. One conventional fire alarm apparatus is described in Japanese Utility Model Laid-Open Publication No. 4(1989)-26947.

The fire alarm proposed in the above mentioned Utility Model public information shown in FIG. 1, is constructed such that when fire sensor 1 detects fire outbreak, first switching element (FET) is operated and then a second switching element (TR) for driving buzzer BZ is operated in response to rectangular signal outputted from latch circuit 2 consisting of two NAND gates N1,N2.

Conventional fire alarm as discussed above has disadvantage that when a fire breaks out, simple alarm tones are just produced without being capable of recognizing the location at which the fire takes place and where to move.

SUMMARY OF THE INVENTION

With the above problems of the prior art in view, it is therefore an object of the present invention is to provide an audible fire alarm apparatus which notifies a location of the fire outbreak and directions with voice when a fire sensor detects the fire outbreak, so that people can exactly recognize the location of the fire outbreak and efficiently move to safe area.

Such an object of the present invention is achieved in an audible alarm apparatus comprising: fire sensing portion for detecting fire outbreak and outputting an associated information data, location setting portion for setting a location in which the fire sensing portion is positioned, system controller responsive to the information data outputted from the fire sensing portion for determining the fire outbreak providing information about the location of the fire outbreak being set in the location setting portion to input and output controlling portion, and controlling interface devices when the fire outbreak data has been received via the input and output controlling portion, DTMF generator for converting the fire outbreak data outputted from the system controller and its associated location information data to dial tone frequency signal and for providing the dial tone frequecy signal to telephone line connecting portion, DTMF receiver for receiving the dial tone frequency signal associated with the fire outbreak data and its associated location information data via the telephone line connecting portion, voice data storage portion responsive to the information outputted from the system controller for providing a voice data written in specified address area, parallel to serial converter for converting parallel data which is read from the voice data storage portion and voice-synthesized in the system controller, to serial data, and for providing the serial data to D/A converter, the digital to analog converter for converting digital data outputted from the parallel to serial converter to serial signal and for providing the analog signal to an amplifier, and the amplifier for providing to speaker voice signal after noise is eliminated.

The present invention will be more clearly understood from the detailed description below in conjunction with the accompanying drawings.

Figure 1:
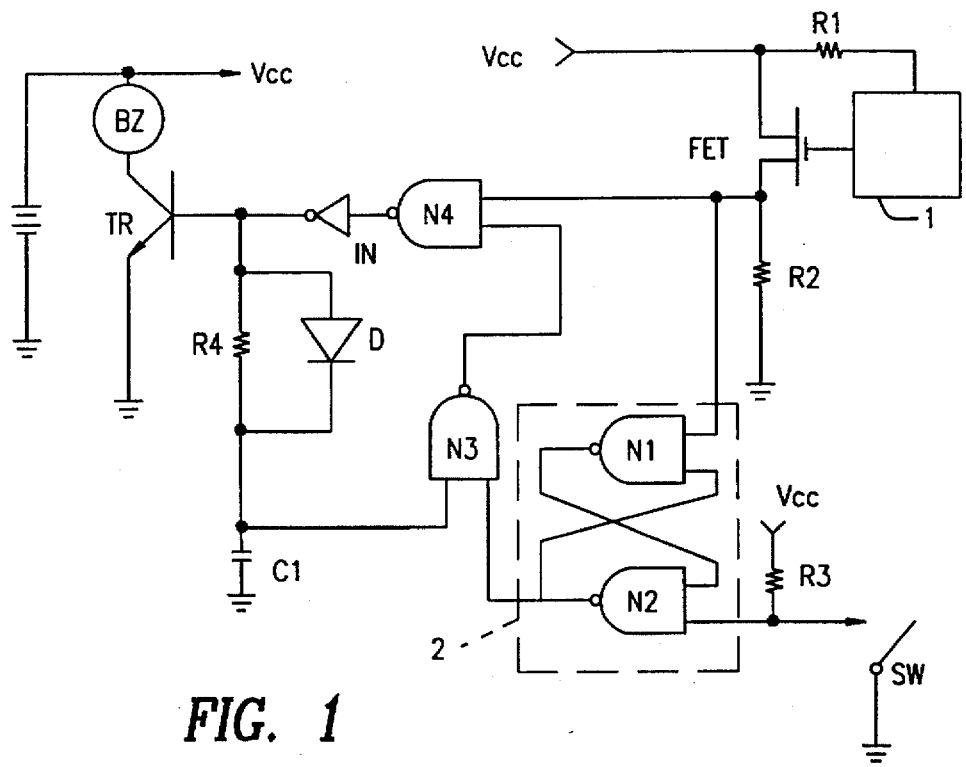
FIG. 1 is a schematic diagram illustrating a fire alarm in accordance with the prior art.

It will be appreciated that for simplicity and clarity of illustration, elements illustrated in the Figures have not necessarily been drawn to scale. For example, the dimensions of some of the elements are exaggerated relative to other elements for clarity. Further, where considered appropriate, reference numerals have been repeated among the Figures to indicate corresponding or analogous elements.

DESCRIPTION OF PREFERRED EMBODIMENT OF THE PRESENT INVENTION

Figure 2:
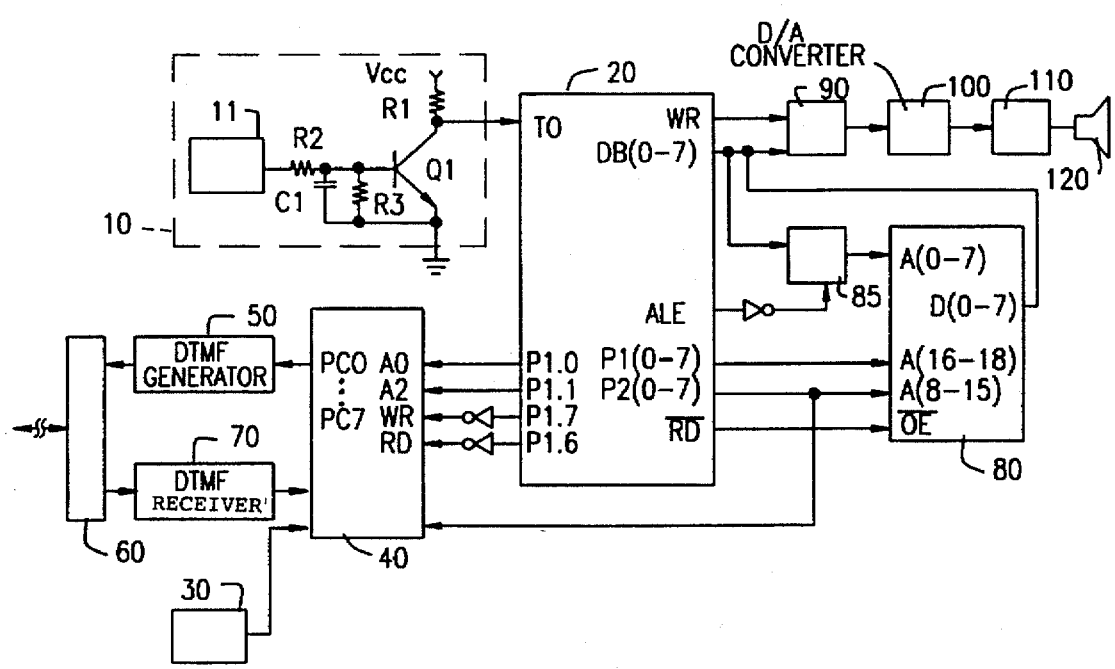
FIG. 2 is a schematic diagram illustrating an audible fire alarm in accordance with the present invention.
Figure 3:
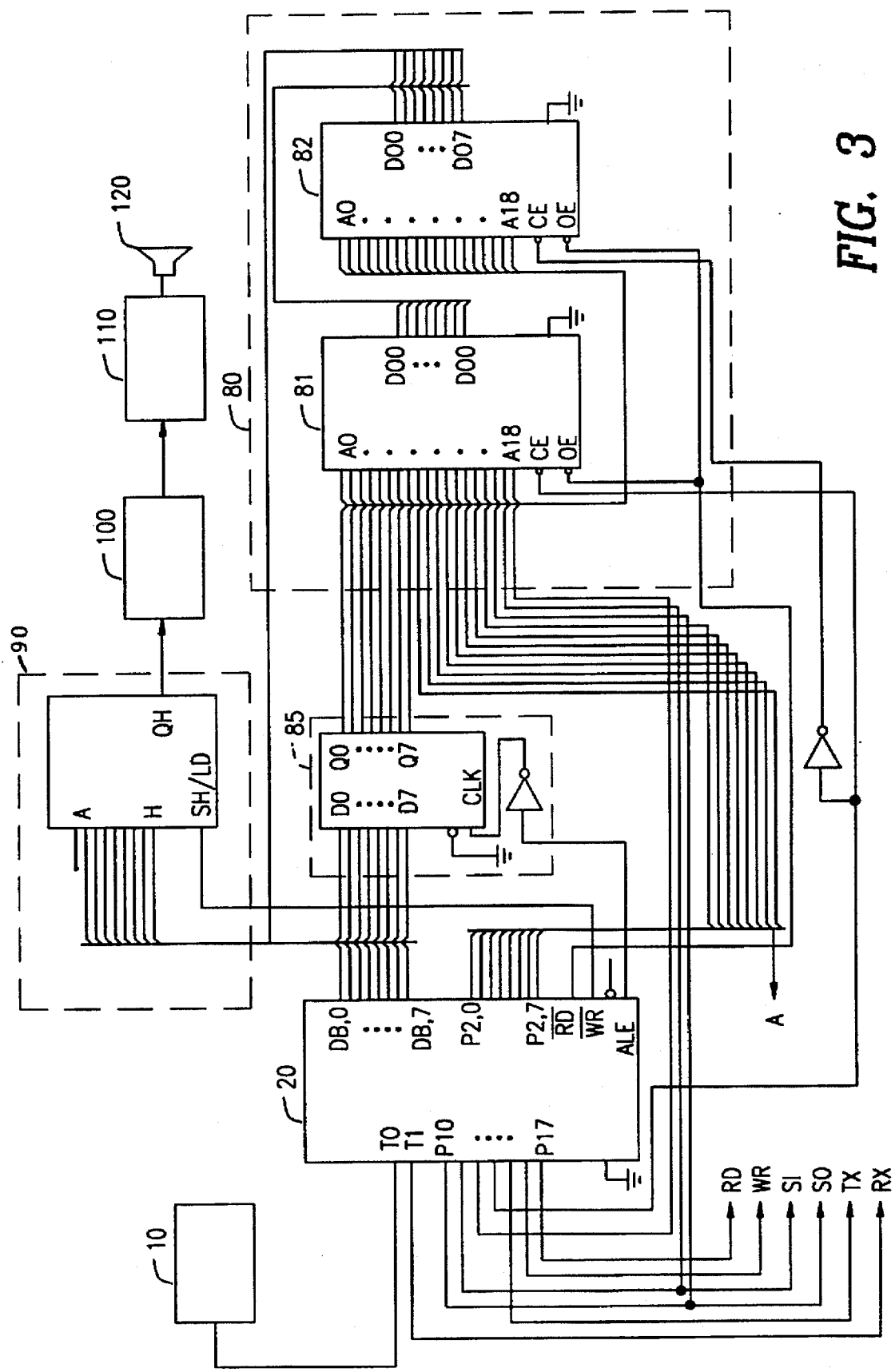
FIGS. 3 and 4 are circuit diagrams illustrating an audible fire alarm in accordance with the present invention.
Figure 4:
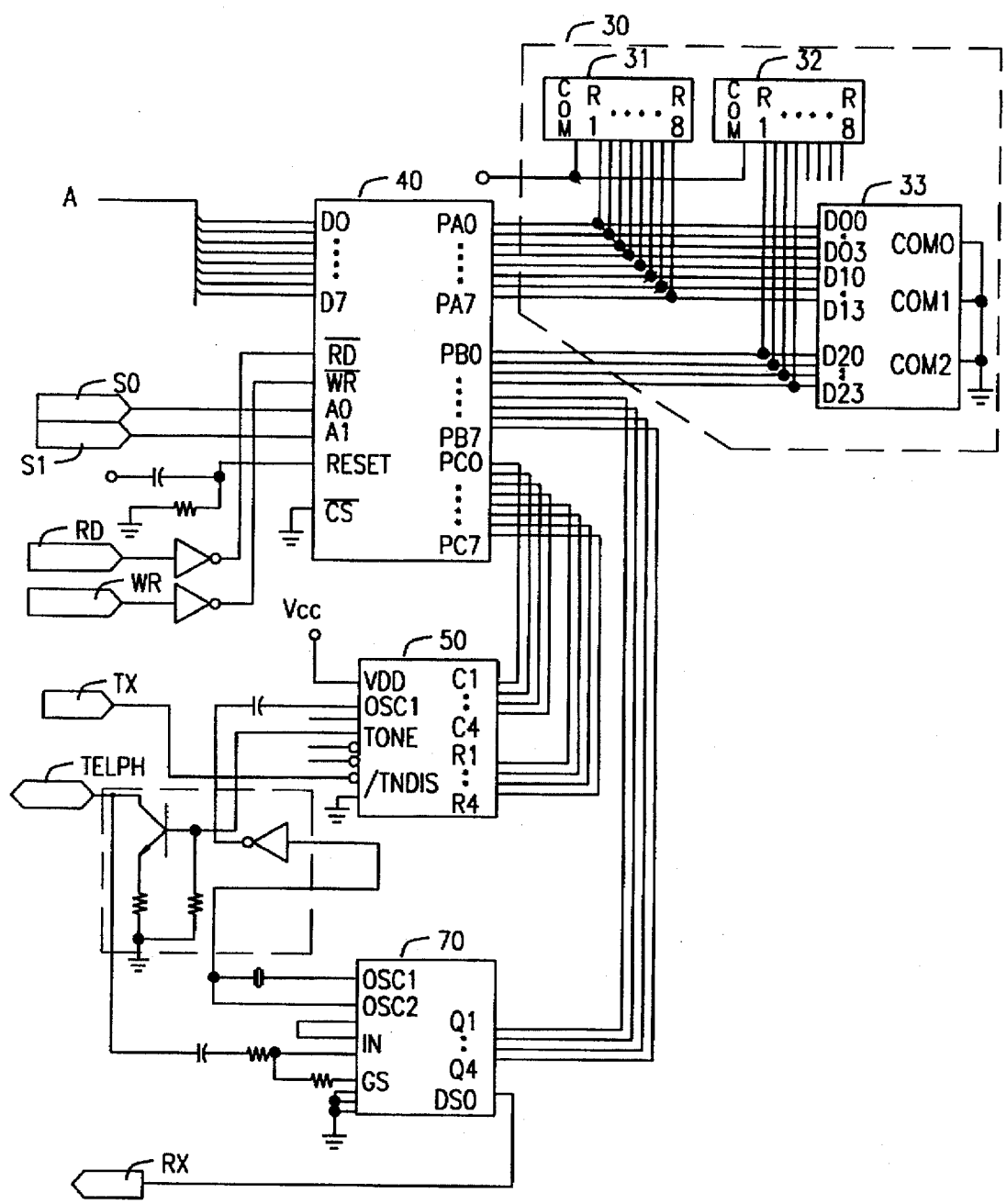

FIG. 2 is a schematic diagram illustrating an audible fire alarm constructed and arranged in accordance with the present invention, and FIGS. 3 and 4 illustrate circuit diagrams according to the embodiment of FIG. 2.

Referring to FIGS. 2 through 4, fire sensing portion 10 includes fire sensor 11, bias resistors R1 to R3 and switching element Q1. The switching element Q1 is switched in response to a data signal outputted when the fire sensor 11 detects a fire outbreak, and provides the signal to an input port T0 of system controller 20.

Location setting portion 30 includes tip switches or rotary switches (not shown) which are coupled to input ports PA0 to PA7, PB0 to PB3 of an input and output controlling portion 40 which controls input and output of the data provided from the external in response to write and read signal outputted from the system controller 20. Each of the values of the switches is set in accodance with the fire sensors.

In addition, DTMF (Dual Tone Multi Frequency) generator 50 is constructed such that a fire outbreak data and its associated location information data are converted to a dial tone frequency signal and the signal is provided to telephone connecting portion 60. DTMF reciever 70 is constructed such that the dial tone frequency signal associated with the fire outbreak data and its associated location information data of another fire alarm provided via the telephone line connecting portion 60 are received and then provided to input ports PB4 to PB7 of system controller 20 via the input and output controller 40.

Voice data storage portion 80 consists of dependently connected memories 81, 82 such that voice data is read in response to addresses A0 to A18 outputted from address latch 85 and system controller 20 via data bus.

Parallel to serial converter 90 is constructed such that voice signal (the signal informing the directions of fire outbreak, its location, safe area, etc) then converted to serial data and is provided to D/A converter 100. The signal is outputted from the D/A converter 100 and then provided to speaker 120 via amplifier 110.

Referring now to the audible fire alarm apparatus of the present invention, operation process is apparent from the following more detailed description, taken in conjunction with the accompanying drawings, which illustrate, by way of example, the principles of the invention.

A plurality of audible fire alarm apparatus according to the present invention are arranged in different locations are connected to telephone lines. The locations of audible fire alarm apparatus are uniquely set in their locations by switches 31 to 33 within the respective audible fire alarm apparatus. If a fire took place, fire sensor 11 of fire sensing portion 10 positioned in the associated location is operated in response to the fire outbreak, stitching element Q1 is operated, then data associated with the fire outbreak is provided to input port T0 of system controller 20.

In the system controller 20, a check is made to determine whether the fire event is a condition for which the fire is detected. If so, fire outbreak data and its associated location data being set in the location setting portion 30 are provided to DTMF generator 50 via input and output controller 40.

When the fire outbreak data and its associated location information data are provided to the DTMF generator 50, the DTMF generator 50 converts its inputted data to dial tone frequency signal, and sends the signal to telephone lines via telephone line connecting portion 60.

When the fire outbreak data and its associated location information data is sent to the telephone lines, DTMF receiver 70 of fire alarm positioned in a given location receives the fire outbreak data and its associated location information data, and provides them to system controller 20 via input and output controller 40. The system controller 20 is responsive to its inputted fire outbreak data and its associated location information data to provide an address signal to voice data storage portion 80 and read a voice synthesized data stored in an address area of the address signal. The voice synthesized data (for example, when a tire occurs in 3rd floor, speaker says "A fire outbreak has been discovered on the 3rd floor. This is 12 the 4th floor. Ladies and gentlemen, please move to a safe area following directions given on the information broadcast channel.") is sent to parallel to serial converter 90. Digital data outputted from the parallel to serial converter 90 is converted into analog signal by a digital to analog converter 100 and is outputted to speaker 120 via amplifier 110 after cancellation of noise. Therefore, system controller 20 of fire alarm which detects the outbreak of fire is operated as mentioned above, and the system controller 20 controls to notify the fire outbreak and produce emergency broadcast by means of speaker.

As discussed above, in accordance with the present invention, since speakers in a plurality of fire alarms notify fire outbreak location and produce emergency broadcast with voice when a fire alarm detects the fire outbreak, people can exactly recognize the fire outbreak location and efficiently move to a safe area.

What we claim is:

1. An audible alarm apparatus comprising:

fire sensing means, including a fire sensor for detecting a fire outbreak and a switching means responsive to a signal detected from said fire sensor for outputting the signal when the voltage level of the signal is more than a predetermined amount, location setting portion for setting a location in which said fire sensing means is positioned and outputting an information data for a location in which a fire is generated, system controller responsive to the signal outputted from said switching means for determining the fire outbreak, for providing information data about the location of the fire outbreak being set in the location setting means to an input and output controlling portion, and controlling interface devices when the fire outbreak location has been received via said input and output controlling portion, DTMF generator for converting the fire outbreak data outputted from said system controller and its associated location information data to dial tone frequency signal and for providing the dial tone frequency signal to telephone line connecting portion, DTMF receiver for receiving the dial tone frequency signal associated with the fire outbreak data and its associated location information data via said telephone line connecting portion, voice data storage portion responsive to the information data outputted from said system controller for providing a voice data written in specified address area, parallel to serial converter for converting parallel data which is read from said voice data storage portion and voice-synthesized in the system controller, to serial data, and for providing the serial data to D/A converter, digital to analog converter for converting digital data outputted from said parallel to serial converter to analog signal and for providing the analog signal to an amplifier, and amplifier for providing to speaker voice signal after noise is eliminated.

2. The audible alarm apparatus of claim 1 characterized in that said voice data storage portion includes one or more dependently connected memories so that in response to the information outputted from the system controller, voice data is read and the voice data is transferred into a data input port of the system controller via data bus.

3. An audible alarm system comprising at least two audible alarm apparatuses as defined in claim 1 which are directly connected via telephone lines.

* * * * *